United States Patent [19]

Smith

[11] 4,369,467
[45] Jan. 18, 1983

[54] VIDEO CAMERA MONITORING SYSTEM

[75] Inventor: William V. Smith, Memphis, Tenn.

[73] Assignee: Lectrolarm Custom Systems, Inc., Memphis, Tenn.

[21] Appl. No.: 225,996

[22] Filed: Jan. 19, 1981

Related U.S. Application Data

[63] Continuation-in-part of Ser. No. 159,172, Jun. 13, 1980, Pat. No. 4,321,625, which is a continuation-in-part of Ser. No. 60,463, Jul. 25, 1979, Pat. No. 4,314,278, which is a continuation-in-part of Ser. No. 22,505, Mar. 21, 1979, Pat. No. 4,225,886, which is a continuation-in-part of Ser. No. 851,812, Nov. 16, 1977, Pat. No. 4,152,696.

[51] Int. Cl.³ .............................................. H04N 5/24
[52] U.S. Cl. .................................................... 358/210
[58] Field of Search ...................... 358/210, 185, 108; 352/179; 340/172 R, 147 MD, 162

[56] References Cited

U.S. PATENT DOCUMENTS

| | | | |
|---|---|---|---|
| 2,974,198 | 3/1961 | McLeod | 179/1 |
| 3,050,713 | 9/1962 | Harmon | 340/172 |
| 3,312,941 | 4/1967 | Booth | 340/166 R |
| 3,508,201 | 4/1970 | Morale | 340/147 R |
| 3,569,741 | 3/1971 | Bolick | 307/244 |
| 3,670,180 | 6/1972 | Grossimon | 307/244 |
| 3,688,262 | 8/1972 | Liquori | 340/147 R |
| 3,719,828 | 3/1973 | Lipskin | 340/166 R |
| 3,932,714 | 1/1976 | Guimier et al. | 340/172 X |
| 4,028,620 | 6/1977 | Kitagawa | 340/172 X |
| 4,070,650 | 1/1978 | Ohashi | 340/172 |
| 4,120,004 | 10/1978 | Coutta | 358/210 |
| 4,190,863 | 2/1980 | Dischert | 358/210 |
| 4,293,876 | 10/1981 | Williams | 358/108 |

FOREIGN PATENT DOCUMENTS 1066232 10/1959 Fed. Rep. of Germany ...... 358/210

Primary Examiner—Michael A. Masinick
Attorney, Agent, or Firm—LeBlanc, Nolan, Shur & Nies

[57] ABSTRACT

A video camera monitoring system includes a plurality of video cameras and a control system provided for selecting one of the cameras to be controlled and causing a plurality of control signals to control various functions of the camera with each signal corresponding to a particular predesignated function. The video cameras of the system can each be individually controlled or controlled simultaneously from a single set of controls at an input console. A separate control circuit is associated with each video camera and is arranged at the location of the camera. Both the control circuit and the camera are provided with power from a source located at the camera location. The output signals from each control circuit are generated in response to constant voltage input signals produced on an input line of the control circuit. An input console is coupled to the input line of the control circuit associated with a video camera through a transmission line over which different constant level voltage input signals are established. The input circuit enables the operator to first select the particular camera to be controlled and then to vary the input signals supplied to the control circuit for the selected camera. The voltage level of the input signal which is supplied is selected from among a plurality of predetermined levels in dependence upon the control function to be achieved. The control circuit, in turn, receives the input signals and in response thereto will activate one of a plurality of switches for providing a corresponding output signal which serves to enable an appropriate camera function.

45 Claims, 14 Drawing Figures

VIDEO CAMERA MONITORING SYSTEM

CROSS REFERENCE TO RELATED APPLICATIONS

This patent application is a continuation-in-part of U.S. patent application Ser. No. 159,172 entitled CONTROL SYSTEM, filed June 13, 1980, now U.S. Pat. No. 4,321,625, which is a continuation-in-part of U.S. patent application Ser. No. 60,463 entitled CONTROL SYSTEM, filed July 25, 1979, now U.S. Pat. No. 4,314,278, which is a continuation-in-part of Ser. No. 22,505, filed Mar. 21, 1979, now U.S. Pat. No. 4,225,886 entitled VIDEO CAMERA CONTROL SYSTEM, issued Sept. 30, 1980 which patent is a continuation-in-part of Ser. No. 851,812 filed Nov. 16, 1977, now U.S. Pat. No. 4,152,696 issued May 1, 1979. The subject matter of both of the applications and both the patents are hereby incorporated by reference.

BACKGROUND OF THE INVENTION

The present invention involves a video camera system having a plurality of video cameras and associated with each a control mechanism for providing a plurality of control signals for selectively enabling a corresponding plurality of control functions for each camera.

First, consideration will be given to the references cited during the prosecution of both of applicant's patents cited above. U.S. Pat. No. 3,932,714 to Guimier et al. discloses a remote electrical transmission system in which a control unit provides a different level voltage output, in dependence upon the position of a selector switch, to a receiver unit including a plurality of zener diodes and associated switching transistors which open or close different control circuits according to the positions in which the control selector switch is set. U.S. Pat. No. 4,028,620 to Kitagawa et al. discloses a system for selectively actuating electrical loads including an instruction unit having a switch mechanism with a plurality of contacts, and an output unit for generating respective output signals corresponding to the voltage signals from the instruction unit. U.S. Pat. No. 4,070,650 to Ohashi et al. discloses a digital signal transmission system in which control signals are either transmitted or not transmitted in accordance with the results of a comparison between set values stored in a decoder and digital signals transmitted from an encoder. When the values of the digital signals are greater than the value set in the decoder comparators, output signals are generated. The output signals are suspended if the values of the digital signals are smaller than those set in the decoder comparators. U.S. Pat. No. 4,123,782 to Kitahara et al. discloses a remote control device for controlling the operation of a camera unit through a series of encoded signals transmitted along a connecting cable.

In the majority of the known control systems, where it is desired to selectively control a plurality of different functions of a member being controlled, it is necessary that a different switch be included in the input circuit of the system for providing an appropriate signal for controlling each of these functions. Each of the signals is then coupled by a separate transmission line from the input circuit to the actual control circuit for activating the corresponding function. Representative embodiments of such systems are disclosed in U.S. Pat. Nos. 3,312,941 to Booth et al.; 3,508,201 to Morale; 3,688,262 to Liquori and 3,719,828 to Lipskin. Since in each of these devices, there is almost an exact correspondence between the number of input selection members and the number of output functions that can be controlled by the system, there is a direct linear relationship between the control capability of the system and the size of the input device. Thus, as the intended use of the system expands, the size and cost of the control system expands at the same rate. Furthermore, since in each of these systems there is almost always a direct link, i.e., transmission line, between each of the input selecting members and the control circuit, it is difficult to separate the input circuit and the control circuit by any significant distance unless one is willing to utilize a large quantity of wiring between the two circuits.

Tha patent to Liquori is possibly of particular interest since the embodiment disclosed by this patent was designed for controlling a plurality of audio-visual devices, which is likewise an area in which the control system of the present invention can be of particular utility. In the system disclosed by the patent to Liquori each of the input buttons is directly connected by a separate line to a remote control assembly, which assembly provides an appropriate output signal that is supplied to each of the audio-visual devices to be controlled.

While several attempts have been made to limit the number of input selecting members which must be utilized in order to control a plurality of control functions, these systems have generally encountered problems of either simultaneously activating a plurality of control functions or entailing such a cumbersome method for avoiding such simultaneous activation that the system becomes impractical. Examples of such systems are disclosed in U.S. Pat. Nos. 3,050,713 to Harmon and 3,569,741 to Bolick et al.

The patent to Harmon discloses a circuit having a plurality of thyratrons that are selectively activated based upon the level of the signal supplied to a signal source. Each of the thyratrons is activated only when an applied input signal is above a corresponding predetermined level. When the thyratron is activated, it generates an output signal for enabling a corresponding control function. Thus, for each control function to be activated by the control circuit, it is necessary to have a separate thyratron. In order to prevent simultaneous actuation of more than one thyratron at a time, a plurality of delay circuits is employed. These delay circuits are coupled with the thyratron such that the thyratron which is activated by the lowest level signal is not activated until the longest delay period has passed. Thus the higher the level of the signal, the shorter the time period that signal is applied while conversely the lower the level, the longer the time period the signal is applied. The duration of the applied signals are selected so as to correspond with the delay circuits coupled to the thyratrons so that the signal only exists long enough to activate the appropriate thyratron.

The patent to Bolick et al. discloses a control circuit for selectively activating different operations within a recording device. The circuit includes a plurality of transistors, each of which is activated when the voltage applied to its base is above a predetermined level. In the system disclosed by this patent, if the level of the applied voltage is sufficient to activate the third level transistor, then the first and second level transistors will be simultaneously actuated.

One other control circuit which has been developed in the prior art is that shown in U.S. Pat. No. 3,670,180 to Grossimon et al. In contrast to the systems disclosed in the other patents, however, in accordance with the embodiment disclosed by this patent a plurality of SCRs are sequentially activated by a series of input signals. The values of the input signals sequentially increase and each of the signals serves to actuate a corresponding SCR. The purpose of the control system disclosed by this patent is to fire a series of rockets in a predetermined order and thus the SCRs need only be actuated in accordance with this predetermined order and it is impossible to selectively actuate the SCRs in any other order.

All the systems disclosed by the patents discussed above involve extremely sophisticated and cumbersome circuitry for carrying out a plurality of control functions. If only a relatively few functions are to be controlled by the system, the utilization of separate circuits for each function may not present a significant burden. As the number of functions to be controlled grows, however, the size of the system grows at the same rate thereby increasing the complexity and cost of the system.

SUMMARY OF THE INVENTION

An object of the present invention is to provide an improved and simplified video camera system and control mechanism.

Another object of the present invention is to provide a video camera system having a plurality of video cameras that are controlled by utilizing a multi-function control mechanism that overcomes the drawbacks of previously known systems as discussed above.

A further object of the present invention is to provide a multi-function control system for selectively enabling one of a plurality of control functions of a video camera in response to a single input signal.

A still further object of the present invention is to provide an improved video camera system including a plurality of video cameras with the power for controlling the operation of each camera being supplied by a power source directly coupled at the location of the camera.

Still another object of the present invention is to provide a video camera control system including a plurality of video cameras for selectively enabling a plurality of camera functions for each camera in response to a signal received from an input control console.

A still further object of the present invention is to provide an improved video camera system including a plurality of video cameras each of which can be easily controlled by any one of two or more input control consoles or simultaneously controlled by two input control consoles.

Still a further object of the present invention is to provide a video camera control system for selectively providing a plurality of output signals to control the functions of a video camera, with each output signal being dependent upon the level of a voltage signal created within this system, by utilizing a plurality of zener diodes each having a different breakdown voltage so that when each zener diode breaks down, it provides a corresponding output signal.

These objects are accomplished in accordance with the present invention by the utilization of a control circuit having a plurality of zener diodes with each zener diode having a different breakdown voltage so that each is actuated in dependence upon a different level input signal. There is at least one control circuit associated with each video camera to be controlled or any other group of operable members that are to be controlled. The actuation of each higher level zener diode also generates a corresponding blocking signal for blocking the output of the next lower level zener diode so that only a single output signal is generated by the system. Each control circuit is supplied on its input line with a fixed d.c. voltage from a power source located at each video camera. The input signals to the system are generated by an appropriate input control circuit which is capable of varying the level of the voltage on the input line of a control circuit of a selected video camera with the level of the voltage varying in dependence upon which zener diode is to be activated. The input circuit is coupled to the control circuit through a single transmission line.

More specifically, the present invention involves a video camera system having a plurality of video cameras each of which can be individually and separately controlled. The video camera system includes a control system for selectively providing a plurality of control signals to a control circuit of a camera selected for control, with the signals being provided one at a time and with each signal serving to enable a separate control function to operate the selected video camera, which is capable of a plurality of different functions. The selection of the control signals depends upon input signals which are established on the input line coupled to the input control circuit. Each of the input signals has a constant voltage and the level of the input signal is selected from a plurality of predetermined levels. These input signals are provided to a control mechanism that includes a plurality of zener diode switches. Each of the zener diode switches is activated when the input signal is above a corresponding predetermined level with the predetermined level for each of these zener diodes being different from the level necessary for activating the other zener diodes. Thus, each zener diode which has been actuated provides an appropriate switching signal. The output from each of the zener diodes is in turn coupled to a gating circuit. The gating circuit in turn when actuated provides an output signal to a transistor switching circuit. The output of each zener diode, except for that zener diode corresponding to the lowest voltage level, is also coupled to an inverter circuit which provides a blocking signal when the corresponding zener diode is activated. This blocking signal from the inverter circuit, which effectively acts as a lockout circuit, is applied to the gating circuit associated with the next lowest level zener diode for preventing such gating circuit from providing an output signal. Thus, if the third level zener diode is actuated, although the first and second level zener diodes are also actuated, the corresponding inverter circuits block the outputs of those zener diodes from reaching their corresponding transistor switching circuits. Hence, the only transistor switching circuit to receive a signal would be the third level transistor circuit. An output function circuit is coupled to each of the transistor switching circuits and in response to a signal from the transistor switching circuits enables one of the control functions of the video camera.

Before providing the control signals, the operator of the input control console is able to select which video camera will be controlled. If there are two or more input control consoles, the operator of each console can select a different video camera for operation or both operators can simultaneously control the same video camera within certain limitations as explained further below. An input mechanism that includes a decimal multiplex decoder enables the operator to enter a two digit code representing the video camera being selected. The decoder translates the inputed numerical code into signals for actuating corresponding switches of a selection switching mechanism which couples the selected video camera to receive the input voltage signals.

While there is a separate control mechanism associate with each video camera, these mechanisms are controlled from an operator's console. At the console is an input mechanism for the control system which allows the operator to manually select the functions to be carried out after the operator has selected the camera to be controlled. For each function selected there is a different level voltage signal produced. Typically there are seven different voltage levels that are used, which levels correspond to the breakdown voltage levels for the various zener diodes that are utilized. In accordance with the illustrated embodiment, these voltage levels are 3.9, 7.5, 12, 16, 20, 25 and 30 volts, although zener diodes with different breakdown voltage may be used. If there are more than seven control functions, then a second control mechanism is used which also is connected to the input console for enabling the voltage on its input line to be varied. Thus for a seven function control there is one signal transmission wire plus ground extending from the input control console to each camera control mechanism; for a 14 function system there are two transmission wires plus ground; and for each additional seven functions there is one additional signal transmission wire. There also is one video line extending from each video camera to the input control console for enabling viewing of the camera being controlled.

The control system of the present invention can be advantageously utilized in connection with controlling along with the video camera other associated equipment within the area surrounding the location of the camera. For example, the control system can be used for controlling the doors opening into the area or turning on and off the lights. The system is especially suitable for controlling various movements of the camera such as panning and tilting and for controlling the iris, focus and zoom functions of the camera. The system also can be adapted to achieve automatic positioning of the camera in a plurality of predetermined positions in response to the different level voltage input signals.

Each of the video cameras in the system can be directed by the operator to assume any one of several predetermined positions, i.e., vertical and horizontal orientation as well as field of view of the camera. In addition to the predetermined positions for each video camera, each camera can be set in a predetermined emergency position, which operation can be carried out by activating a single switch at an input console. In addition, each of the video cameras can be programmed to leave any of its designated positions at predetermined intervals, scan through a set sweep angle and then return to one of its designated positions. The time interval can be randomly selected by a random time generator and typically would be on the order of 0–10 minutes. The sweep angles are typically between 45° and 360°.

DESCRIPTION OF THE PREFERRED EMBODIMENTS

Figure 1:
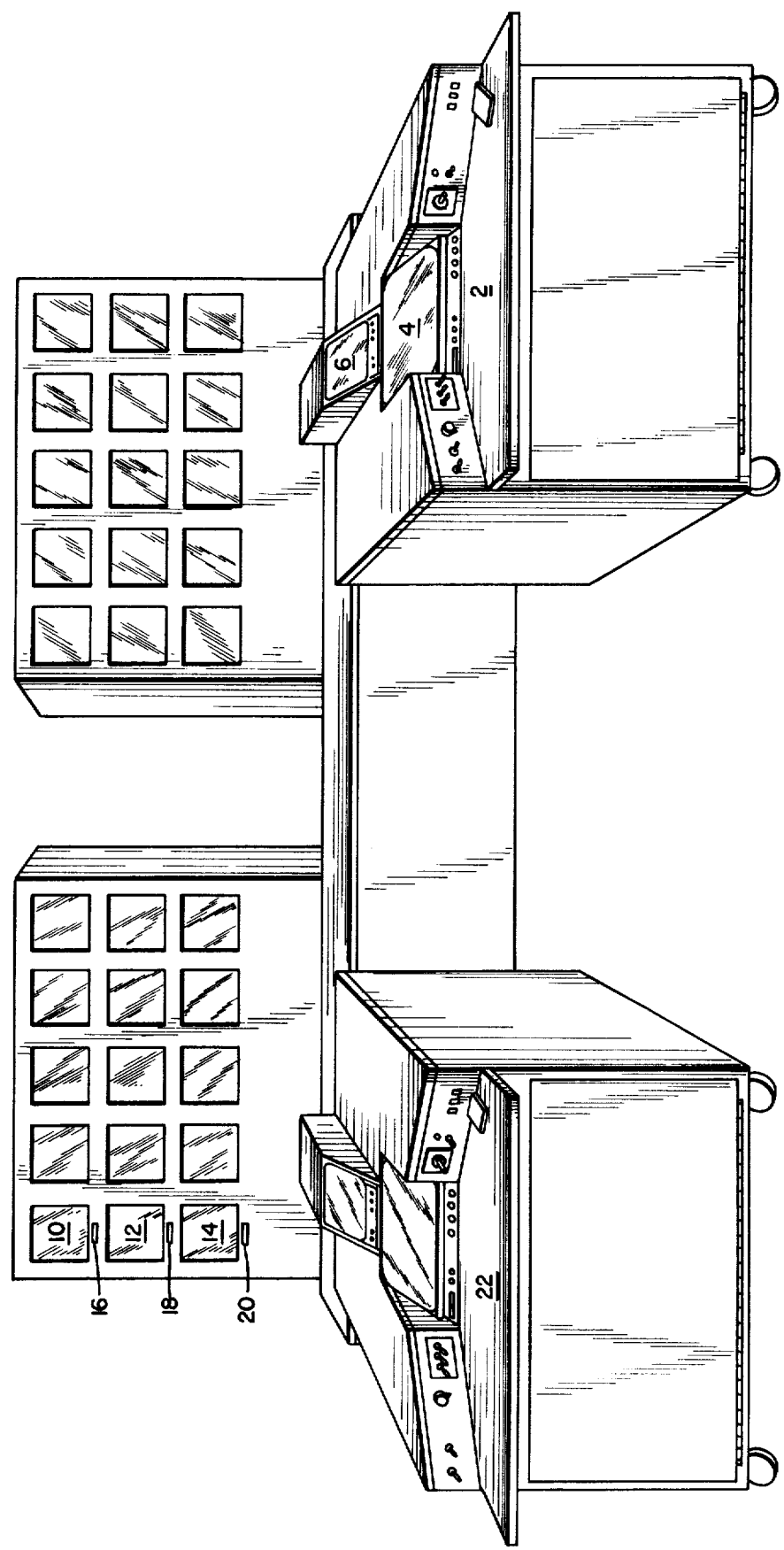
FIG. 1 is a perspective view of an input monitoring station of a video camera monitoring system in accordance with the present invention.

The video camera monitoring system in accordance with the present invention includes both an input control section such as shown in FIG. 1 and a plurality of remotely located video camera units. The input control section includes two input control consoles 2 and 22. Each control console includes a primary video monitoring screen 4 and a secondary video monitoring screen 6. The operator of input console 2 selects a particular remote video camera to be controlled through selection pad 8. The video signal from the particular camera presently under control by the operator of input console 2 is shown in video screen 4. Simultaneously, the particular camera being controlled by the operator of input console 22 is shown on secondary video monitoring screen 6 of input console 2.

In addition to having immediately before the operators the video signals from the two particular cameras under control, set up in front of the operators of the input consoles can be a plurality of video screens, such as screens 10, 12 and 14, that display the video signals received from every camera in the system. In addition to being able to control the video cameras of the system, other various controllable members can be controlled from the same input console.

In order to provide greater diversity of control, besides enabling each of the video cameras to be controlled from input consoles 2 and 22, it also is possible to have an input terminal, such as terminals 16, 18 and 20, associated with and located adjacent to each of the video screens, such as screens 10, 12 and 14, respectively. These input terminals allow other persons within the video monitoring room to utilize a portable handheld input control unit for controlling the cameras. Such portable units are plugged into any one of the terminals for controlling the particular video camera associate with such terminal. The portable input control circuit would have the same basic input control circuitry as the input control console, which circuitry is described below and in applicant's prior U.S. patents and copending applications, which were noted above.

Figure 2:
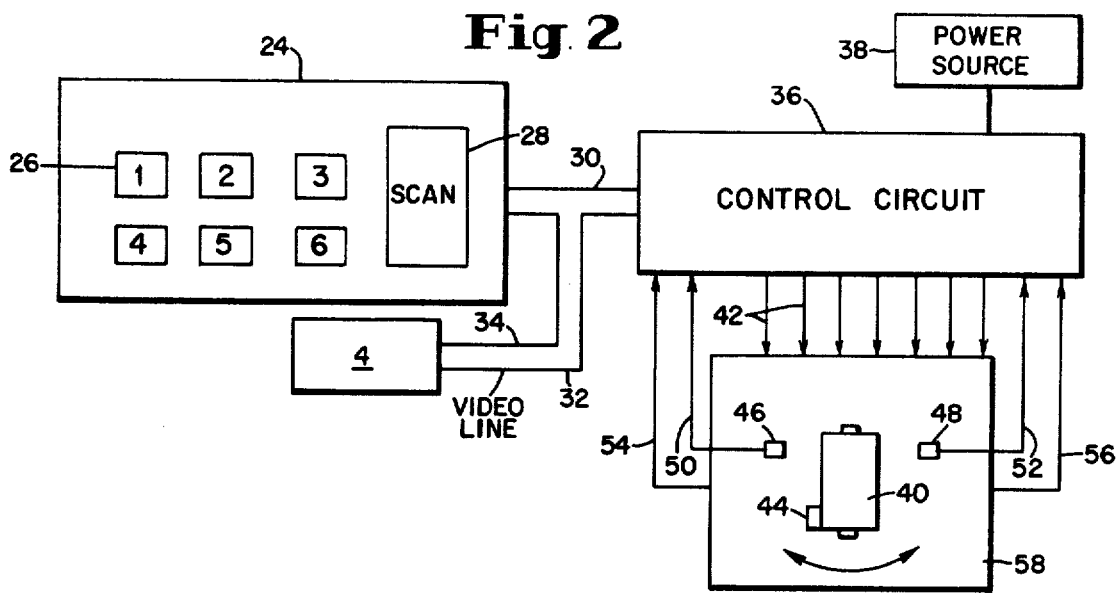
FIG. 2 is a basic block circuit diagram illustrating the input and control circuits for a video camera system embodying the principals of the present invention.

As shown in FIG. 2, the control system basically includes two primary circuits, an input circuit 24 and a control circuit 36. The power for the control circuit is provided by a power source 38 directly to the control circuit. Thus, the power for operating the control circuit originates from a location adjacent to the control circuit and the video camera under control and not from the input circuit. The input circuit, however, enables the voltage signal being supplied to the control circuit to be varied. Once input circuit 24 is coupled to a control circuit, such as circuit 36, associated with a particular video camera that is selected through selection pad 8, the input circuit is coupled to the voltage supply to the control circuit through transmission line 30. The voltage supply to the control circuit which is also the voltage existing across transmission line 30 can be varied from the input circuit location as further described below.

The particular voltage that is established across transmission line 30 and thus on an input line of control circuit 36 is dependent upon which of a plurality of buttons 26 or a scan button 28 is pressed. The operator of the system presses one of the buttons at the input control console which in turn establishes a particular voltage associated with such button both across transmission line 30 and on the input line of control circuit 36. Control circuit 36 then in dependence upon the input signals that are received provides an output signal along one of its output lines 42. The output signals from the control circuit serve to selectively actuate various control functions of a video camera 40.

Associated with each of the video cameras is a separate control circuit and possibly several control circuits, and a separate source of power. The source of power, however, would originate from an outlet from the main power line running through the facility where the video system is utilized. The line voltage from the power source is then rectified within the control circuit to provide the necessary d.c. operating voltage.

At least one transmission line 30 plus a ground line extends between the input control console and each of the video camera controls. The number of actual transmission lines depends on the number of various functions that are provided within a system for controlling any one of the particular cameras. Generally one transmission line is provided for each seven functions although this number can be varied. Inasmuch as transmission line 30 is not carrying any a.c. voltage or coded voltage signals, a single small gauge wire can be used for line 30. In addition to transmission line 30 there is also a single video line coupled between each camera and the input console. Such as shown in FIG. 2, a video line 32 extends from control circuit 36 to video screen 4 and in addition a line 34 for controlling video screen 4 from the input circuit also can be provided. While only a single set of wires between the input circuit and control circuit is shown in FIG. 2, the lines including the video lines from the control circuit would be coupled to the input circuit through a switching mechanism so that the operator at the input control console could selectively determine which particular camera the operator controlled at a particular point in time and would simultaneously view the video signals received by such camera. In addition to the video line being attached so that the signal can be viewed on screen 4, each of the video lines is coupled to a separate video monitoring screen associated with the particular camera such as shown by the plurality of screens in FIG. 1, e.g. screens 10, 12 and 14.

Figure 5:
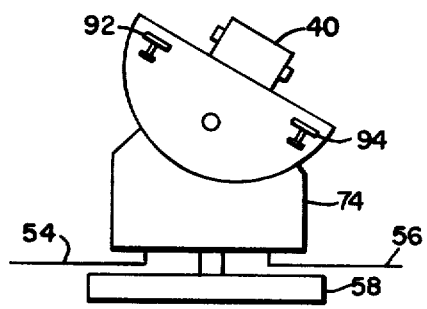
FIG. 5 is an elevational view of a swivel and tilt mounting unit used to support a video camera.

Each camera 40 such as shown in FIGS. 2 and 5 is mounted on a rotatable pedestal 74 which in turn is mounted on a mounting support 58. In a normal surveillance utilization, mounting support 58 could be attached to the ceiling and camera 40 then would extend down from the ceiling pointing in a downward direction.

A magnet 44 can be mounted on the camera for movement with camera 40 so as to actuate a pair of magnetically operated position sensing switches 46 and 48. Actuation of switches 46 and 48 provides position feedback signals to control circuit 36 via a pair of input lines 50 and 52 so as to indicate right or left camera orientation. The video camera also includes a pair of mercury switches 92 and 94 (FIG. 5) that are actuated when the camera tilts in one or the other direction. Mercury switches 92 and 94 are coupled to control circuit 36 through input lines 54 and 56 so as to indicate the up or down orientation of the camera.

Figure 3:
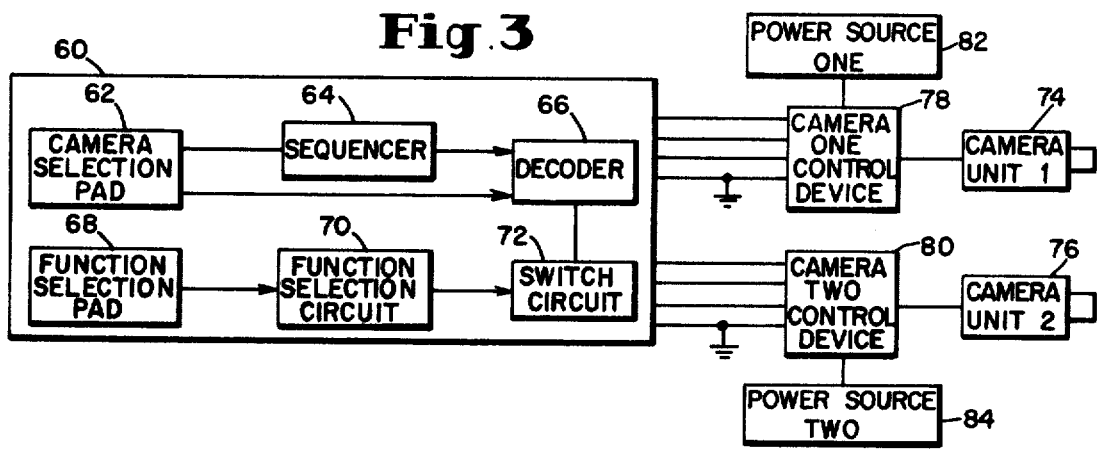
FIG. 3 is another basic block circuit diagram for a video camera system having a plurality of video cameras capable of being controlled in accordance with the principals of the present invention.

While input circuit 24 and control circuit 36 discussed above in connection with FIG. 2 set forth the basic operation of the system, a more detailed explanation can be appreciated from a discussion of the circuitry illustrated in the subsequent figures. Input control console 60 such as shown in FIG. 3 has transmission lines coupling it to two control devices 78 and 80 which are respectively associated with camera units 74 and 76. In addition to the transmission control lines, there are video signal lines connected between input console 60 and each of the camera control devices and in turn each of the cameras. Included within input control console 60 are a camera selection pad 62 for selecting a particular camera to be controlled and monitored directly by the input console, a sequencer for enabling a group of cameras to be selected for control and a decoder for feeding appropriate signals to a switch circuit for coupling the input control console to a particular camera control device. In addition, input control console 60 includes a function selection pad 68 and a function selection circuit 70 so that once a particular camera for control has been selected that camera can then be controlled from input control console 60 by selecting various functions to be carried out. Each of the camera control devices, 78 and 80, is supplied with power from a respective power source, 82 and 84, located adjacent to such control device.

Figure 4:
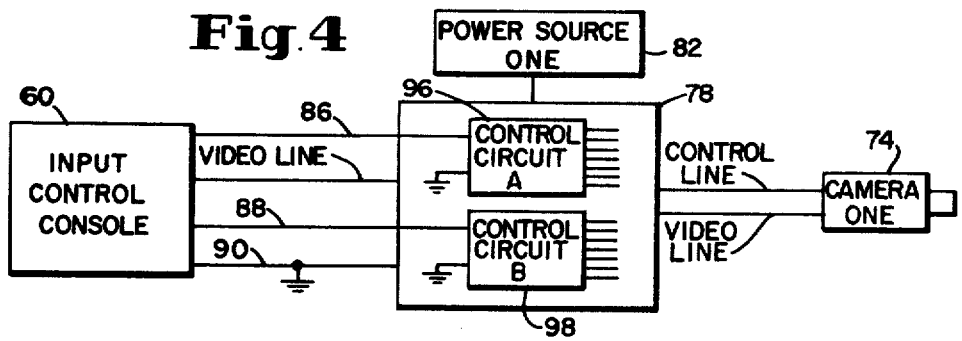
FIG. 4 is a block circuit diagram of a portion of the system illustrated in FIG. 3.

As shown in FIG. 4, each camera control device such as device 78 includes at least two control circuits such as control circuit A, 96, and control circuit B, 98. The input control console 60 is then coupled to control circuit 96 through a transmission line 86 and to control circuit 98 through a transmission line 88. In addition, there is a video line that extends from the input control console to the control circuit. Inasmuch as a.c. signals only are transmitted along the video line, only the video line needs to be a co-axial cable. The other transmission lines as well as any ground lines such as line 90 that are provided need only be single small gauge wire without any special insulation. Since the only voltage across transmission lines 86 and 88 is a relatively low level d.c. voltage that is maintained at any one of several selected levels in dependence upon the particular function selected, any noise that may be picked up by the line from adjacent equipment will have no effect on the operation of the system of the present invention. The control circuits A and B, 96 and 98, are set up so as to be capable of controlling 14 different functions, 7 functions each, for camera unit 74.

While only two camera units have been illustrated in FIG. 3 as being controlled by the input control console, any number of camera units can be controlled by control console 60. In fact, control console 60 is normally capable of handling up to 100 video camera units. Before applying the actual control signals to the camera unit, the particular camera unit to be controlled is selected. The operator of input control console 60 will manually input a selected numerical code into camera selection page 62 which code represents the particular camera unit that the operator desired to control from input control console 60. This numerical code is then fed to decoder 66 which provides appropriate signals for controlling switch circuit 72. Switch circuit 72 can be a relay circuit that enables the functions that are selected by the operator to be coupled to a particular camera unit selected.

As an alternative to selecting a particular camera unit for control, the operator can select a group of camera units, such as, for example, units 20–29 or 40–49. In selecting such a group of units, the operator first enters the first digit into camera selection pad 62 which selects the particular group of units. The operator then activates sequencer 64 which sequentially moves through all of the units of the particular group selected. These signals are again supplied to switch circuit 72 through decoder 66.

Once a particular camera to be controlled is selected, the operator selects the function to be performed on function selection pad 68. The form of function selection pad 68 can be similar to that illustrated by input circuit 24 in FIG. 2. However, while input circuit 24 only includes 7 functions, function selection pad 68 in FIG. 2 is capable of allowing the operator to select between 14 functions. Fourteen different functions are possible since there are two control circuits, 96 and 98, within each of the control devices such as shown in control device 78. If additional control circuits are provided in control device 78 then each function selection pad could provide additional buttons for selecting other functions. Not all of the various functions need be selected through a function selection pad. Alternatively, other control actuating members can be provided on the input control console, e.g., a lever movable in either the up or down direction as well as right or left direction for enabling corresponding movement of the camera selected for control in such direction.

Figure 6:
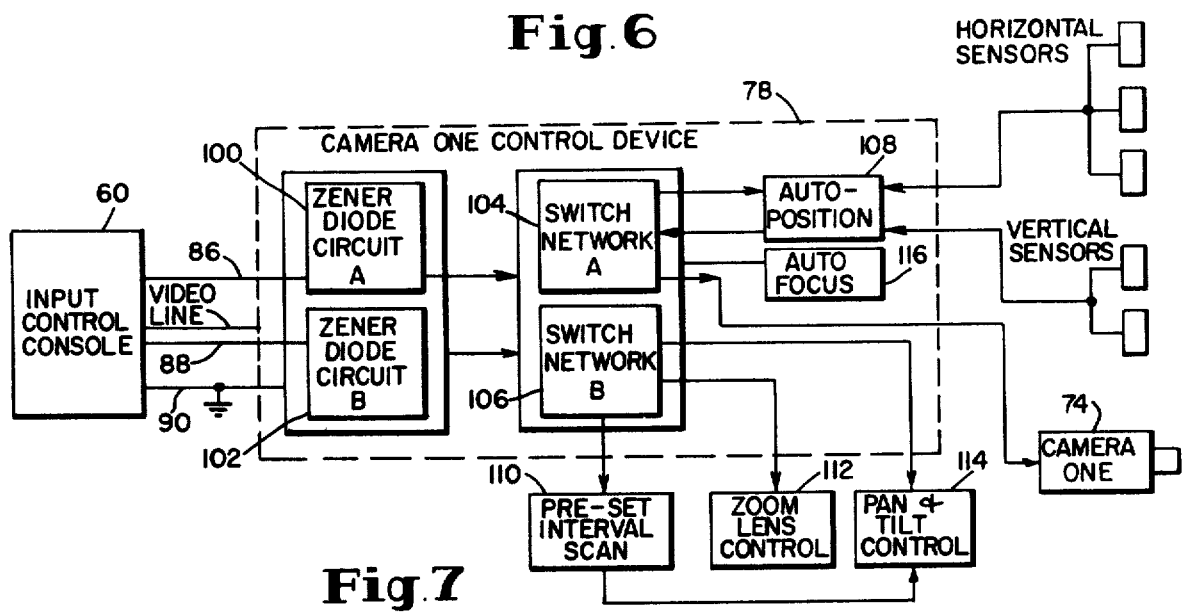
FIG. 6 is a more detailed block circuit diagram of that portion of the system illustrated in FIG. 4.

A more detailed illustration of control device 78 and the related equipment for controlling the operation of camera unit 74 is illustrated in FIG. 6. Control device 78, which is set up so as to be able to carry out 14 functions, as indicated includes control circuit A, 96, and control circuit B, 98. Control circuit A includes a zener diode circuit A, 100 and a switch network A, 104. Similarly control circuit B includes a zener diode circuit B, 102 and a switch network B, 106. The input voltage signals that are established across the transmission lines by input control console 60 are supplied to input lines of zener diode circuits 100 and 102.

As will be further described below, each of the zener diode circuits includes a plurality of zener diodes which have different breakdown voltages. In response to the voltage on the input line of the zener diode circuit being above the breakdown voltage of particular zener diodes, such zener diodes are activated. The outputs from the zener diodes are then transmitted to corresponding switches of the corresponding switch network. The output of each zener diode is supplied to a gating circuit, which forms part of the zener diode circuit. The output of each zener diode that is activated will block out the output from the zener diode activated by the next lower level voltage by disabling the gating circuit associated with the lower level zener diode. Thus the activation of the zener diodes of circuit 100 will lead to activation of one of the switches of switch network 104. Similarly activation of zener diodes within circuit 102 will lead to the activation of one of the switches of switch network 106.

The outputs from switch networks 104 and 106 are coupled to various control devices for controlling different functions of camera 74. Outputs from switch network 104, for example, can be connected to an automatic position control mechanism 108 and an automatic iris control mechanism 116. The automatic position control mechanism is attached to a plurality of vertical sensors and horizontal sensors. These sensors, which can be either micro-switches or mercury switches, will sense when the camera has reached a particular predetermined position. The utilization of mercury switches is often advantageous especially where the video camera is being utilized outdoors since the mercury switches are not temperature sensitive. Thus automatic position control mechanism 108 will move camera 74 until the camera has reached a preselected position where either a contact member attached to the camera contacts and activates a particular sensor or the mercury switch senses that the camera has reached a particular orientation at which time a feedback signal to switch network 104 can terminate the operation of automatic position control mechanism 108. Automatic iris control mechanism 116 will automatically vary the opening of the iris of camera 74 so as to maintain the brightness of the video signal within certain prescribed limits.

Switch network 104 also can contain a switch for turning camera 74 on and off. Switch network 106 is illustrated as controlling pan and tilt control 114, zoom lens control 112 and preset interval scan 110. Pan and tilt control 114 controls the panning and tilting movements of camera 74. Zoom lens control 112 can be operated to cause the lens of camera 74 to vary from its wide angle to its telescopic positions. Preset interval scan 110 is used for causing pan and tilt control 114 to move camera 74 through a plurality of preselected positions.

Preset interval scan 110 ramdomly selects various preselected positions to which camera 74 is to be moved. In addition, the time interval that camera 74 spends within each of the preselected positions also is determined by preset interval scan circuit 110. The interval scan circuit can be directly connected to pan and tilt control circuit 114 or can be coupled to the pan and tilt control by a feedback line through the switch network. In either situation, the interval scan circuit can be provided with a plurality of inner diode circuits with each zener diode having a different breakdown voltage. Upon application of various breakdown voltages, one of the zener diodes is actuated which provides a control signal for moving the camera into the preselected position. After a set period of time, a new voltage is applied and the camera is then moved into a different corresponding preselected position.

Figure 7:
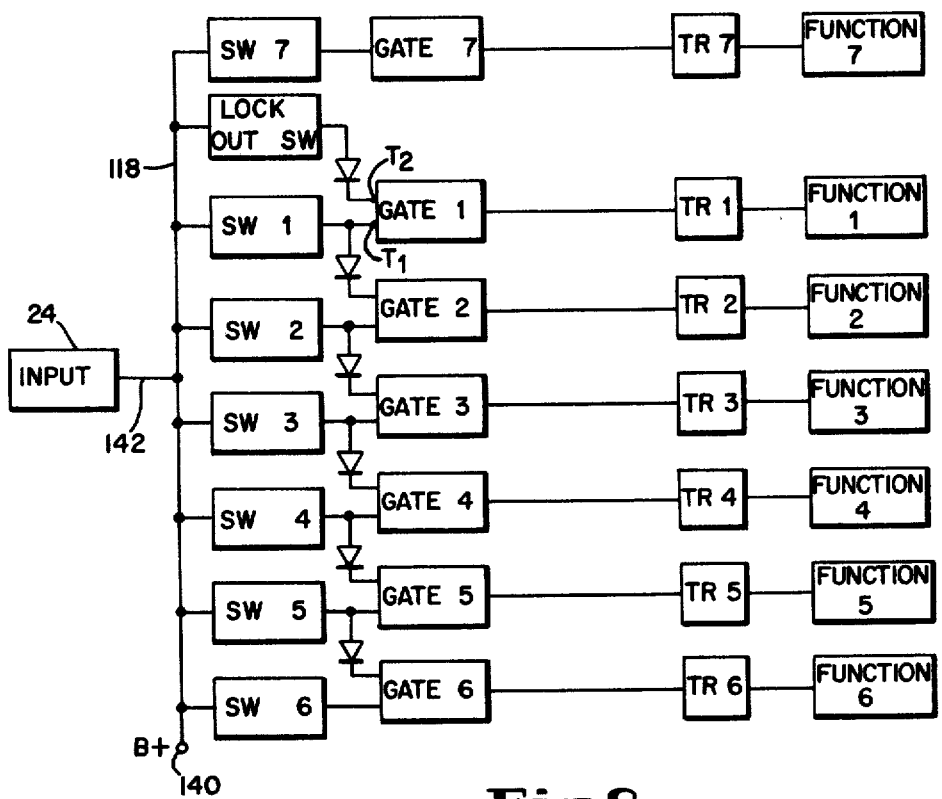
FIG. 7 is a block circuit diagram showing details of the control circuit and the input circuit of the present invention.

A more detailed illustration of a zener diode circuit and corresponding switch network circuit such as circuits 100 and 104 is illustrated in the block diagram circuit of FIG. 7. Power is supplied to an input line by a rectified source of power 140. The D.C. voltage which is established by the source of power 140 on input line 118 can be varied from the input circuit 24, which is coupled to the input line through transmission line 142. Actuation of various buttons at input circuit 24 will cause the D.C. voltage on input line 118 to be reduced to a level associated with the particular input button selected at input circuit 24.

The D.C. voltage on input line 118 is supplied to each of the switching circuits SW-1 through SW-7 along with lockout switch LOSW. Each of the switching circuits is actuated only when the applied voltage on line 118 is above a predetermined level with such predetermined level normally being different from the level for each other switch so that only one switch is activated at a time. The switches are set up so that when the voltage on input line 118 is at its highest level which occurs when no function has been selected on input circuit 24 for causing any drop in the voltage level on line 118, then actuation of lockout switch SW can be used for preventing any functions from being controlled by the control circuit.

Figure 9:
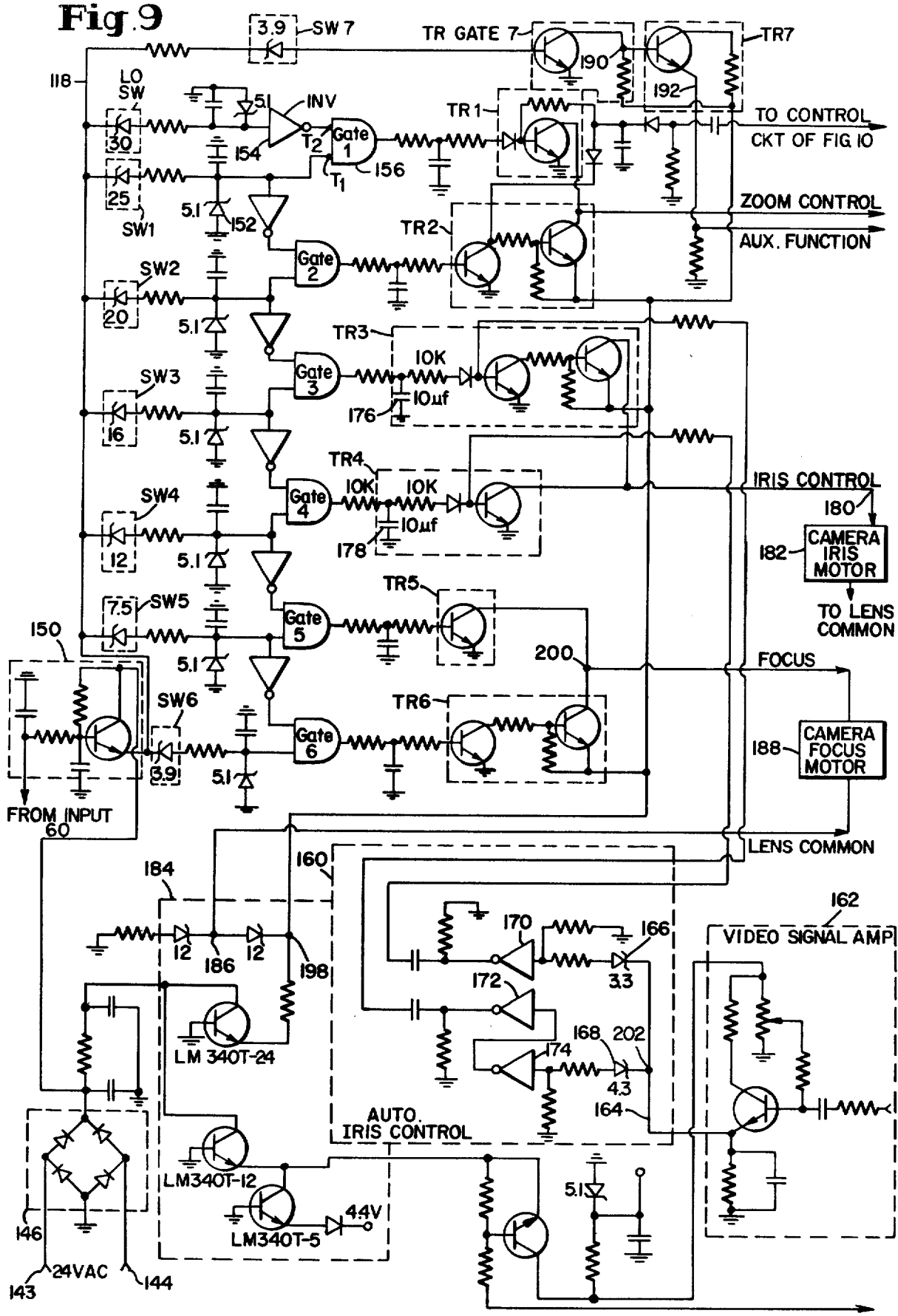
FIGS. 9, 10 and 11 are schematic circuit diagrams of three different control circuits that are exemplary embodiments of the present invention.
Figure 10:
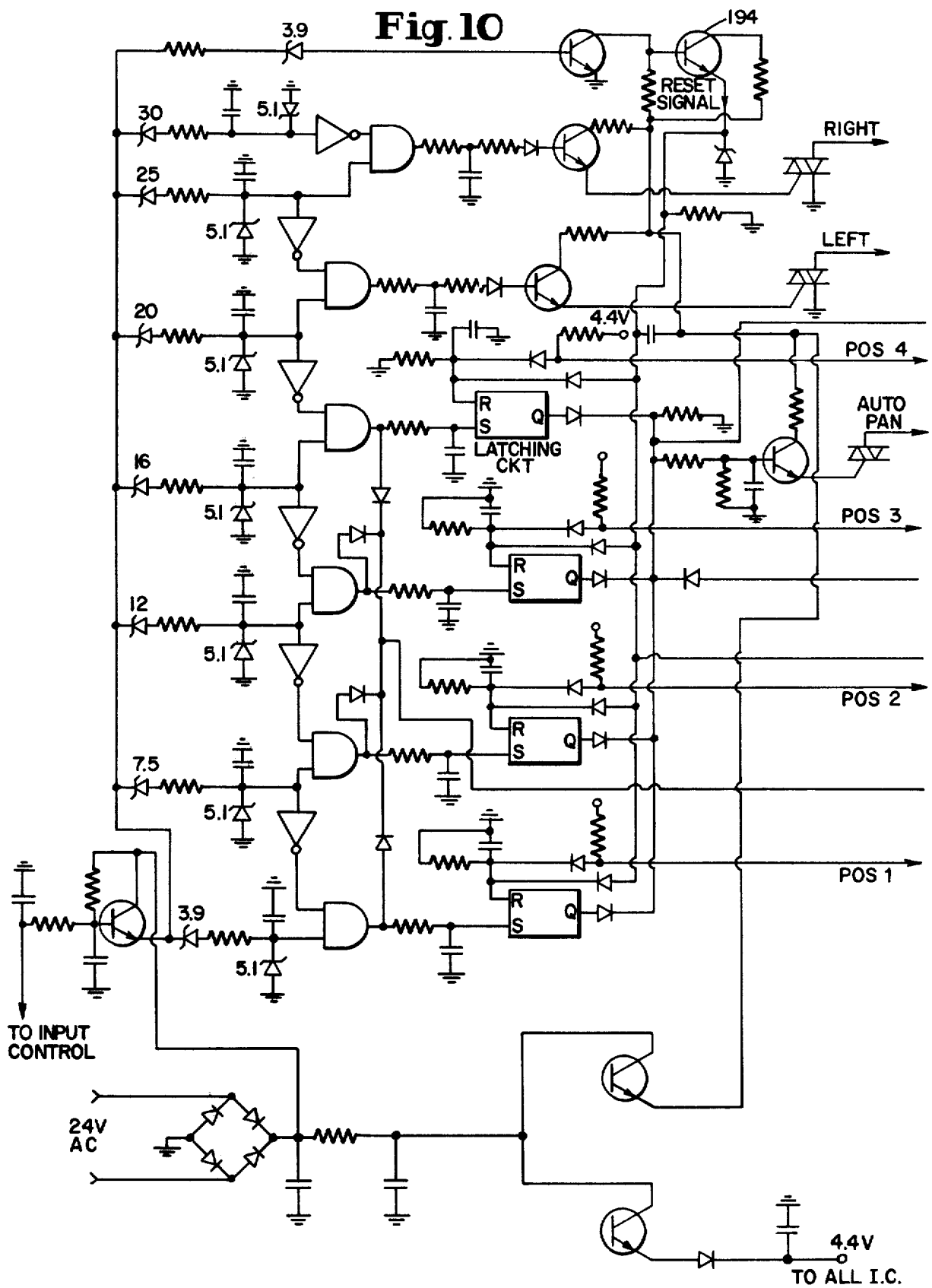
Figure 11:
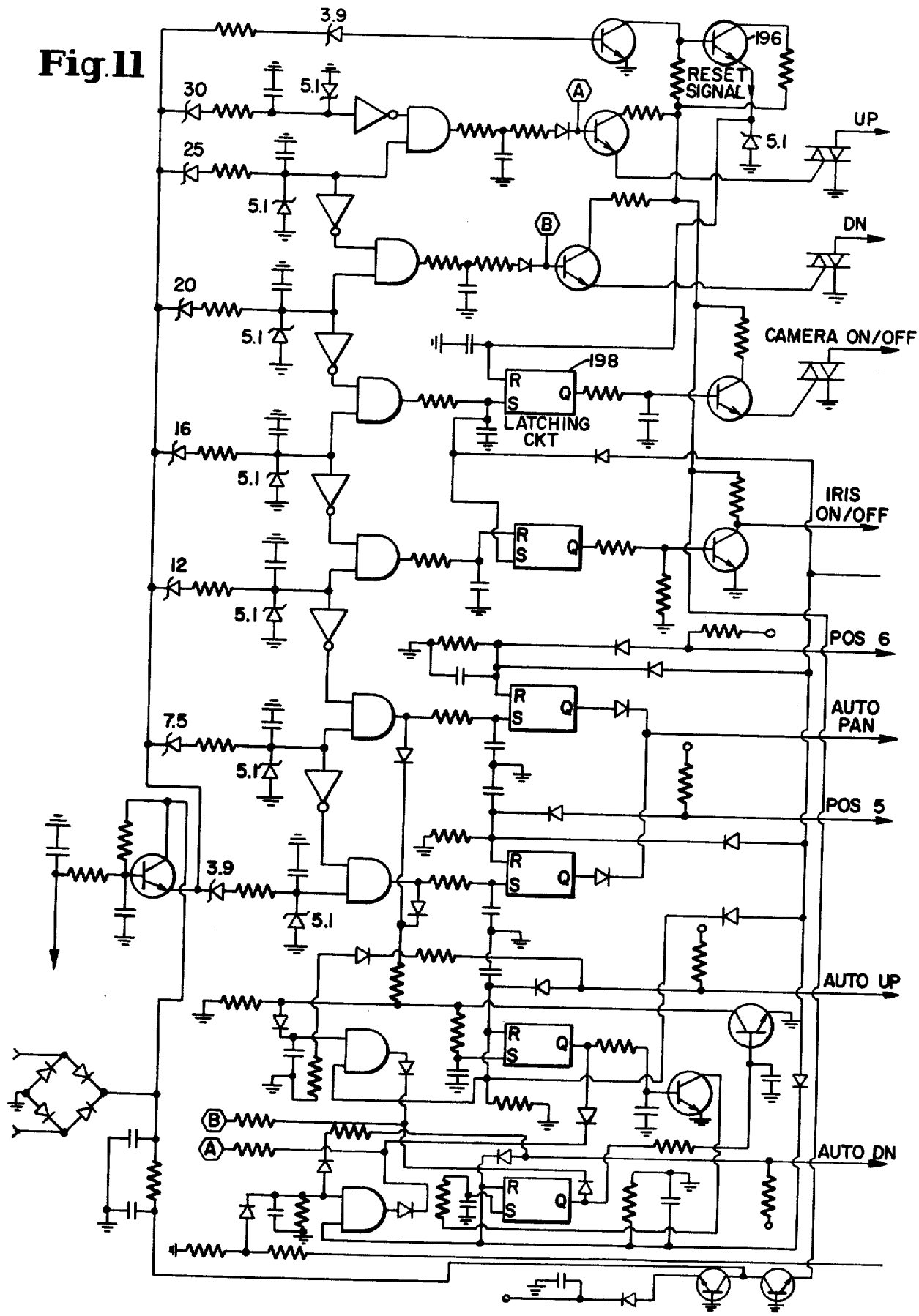

In the embodiment shown in FIG. 7, the higher the number on the switch circuit the lower the actuating voltage for actuating such switch. Thus, as shown in FIGS. 9 through 11: SW-1 is a zener diode with a breakdown voltage of 25 volts, SW-2 20 volts; SW-3 16 volts; SW-4 12 volts; SW-5 7.5 volts; SW-6 3.9 volts and similarly SW-7 3.9 volts. The lockout switch SW has a zener diode with a breakdown voltage of 30 volts. However, zener diodes with different breakdown voltages can be used. Thus, if 36 volts is applied by source 140 on line 118 and such voltage is not decreased by input circuit 24 then all of the outputs from the various zener diode switches will be blocked. Lockout switch SW serves to block the output otherwise resulting from actuation of the highest level zener diode. With respect to switch SW-7, this switch is set up so that only when the switch is not activated, the voltage is below 3.9 volts, is any output obtained from transistor gate 7. More explicitly, as long as the voltage on input line 118 is above 3.9 volts then transistor gate 7 provides no output. Alternatively, if the voltage on line 118 is dropped to a level below 3.9 volts then an output is caused to be generated from transistor gate 7.

The output from each of the zener diode circuits is fed to a corresponding gating member and the output from each of circuits SW-1 through SW-5 is fed to an inverter which is coupled to a gating circuit associated with the next lowest level zener diode switch. Taking switch SW-1 as an example, it can be seen from FIG. 7 that this switch is coupled both to Gate 1 and to an inverter which is in turn coupled to Gate 2. If the input voltage on input line 118 is above the level needed for causing breakdown of the zener diode of switch SW-1 then an output from such switch is provided and fed to Gate 1. Gates 1 through Gate 6 are all AND gates and thus positive signals must be present on both terminals in order for an output from the gate to be generated.

Accordingly, if the voltage on input line 118 is above the level needed for actuating switch SW-1 but below the voltage needed for actuating lockout switch LOSW then positive voltages are provided on both terminals of Gate 1. If the voltage on line 118 is below the level needed for actuating lockout switch LOSW then there is a low, on the output side of lockout switch LOSW which is supplied to the inverter thereby causing a high signal on the associated terminal T2 of Gate 1. However, if the voltage on input line 118 is high enough to cause breakdown of the zener diode of lockout switch LOSW then there is a signal on the output side, or a high on the output side of such lockout switch; this high after being fed through the inverter causes a low to be supplied to the corresponding terminal T2 of Gate 1. Thus when lockout switch LOSW is actuated the two terminals of Gate 1, T1 and T2, receive a 1 and a 0 respectively. The 0 signal on terminal T2 blocks or prevents any output from being generated by Gate 1.

The output from each of the gate circuits, Gates 1 through 6 and transistor Gate 7 is respectively coupled to a corresponding transistor switching circuit, TR-1 through TR-7. The output of the transistor switching circuits in turn are coupled to various circuitry for controlling different functions such as represented by the blocks Function 1 through Function 7 in FIG. 7. With respect to switch SW-7, this switch can be used for actuating either a separate function as represented by block Function 7 or can serve to reset other various portions of the circuitry.

Figure 8:
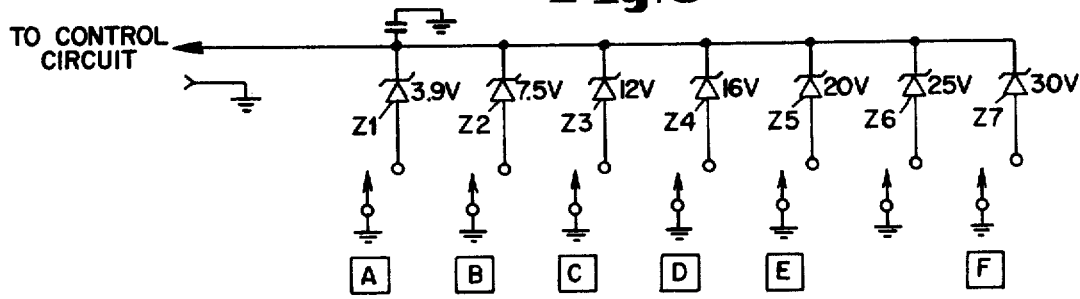
FIG. 8 is a circuit diagram of one section of the input circuit in accordance with the present invention.

While the circuitry of the input circuit has been described in greater detail in applicant's prior U.S. patents referred to above, FIG. 8 provides a representative illustration of one portion of such circuitry. As can be seen from FIG. 8, actuation of any of the buttons, A through F, causes a corresponding one of the zener diodes in the input circuit, zener diodes Z-1 through Z-7 to be attached to ground. The breakdown voltages of these zener diodes will match those of the zener diodes of the control circuit. The output terminal from the input circuit in FIG. 8 is coupled to input circuit 118 and hence the voltage supplied to line 142 to the control circuit is initially the D.C. voltage supplied by source 140. If a function is selected from the input circuit shown in FIG. 8 this will then vary the voltage across transmission line 142. Taking zener diode Z-3 and button C as an example, connecting the rear end of zener diode Z-3 to ground will cause the voltage on line 142 to be reduced from 36 volts, which is the voltage supplied by source 140 in accordance with the particular embodiment, to 12 volts which is the breakdown voltage of zener diode Z-3. In turn this will cause the voltage on line 118 to drop to 12 volts which is the breakdown voltage for zener diode switch SW-4 and thus switch SW-4 will be actuated in turn actuating Gate 4, transistor TR-4 and Function 4.

FIGS. 9, 10 and 11 illustrate three exemplary control circuits that can be provided in accordance with the present invention. Each of these circuits has been set up so as to carry out different control operations of a video camera of a video camera monitoring system that may be employed in utilizing the present invention. The various functions, however, can be changed and are merely set forth herein as desirable examples. In describing the three circuits, greatest attention is given to the circuit of FIG. 9 merely for the sake of convenience inasmuch as the basic operation of the circuits of FIGS. 10 and 11 is essentially the same.

Power is supplied to the circuit of FIG. 9 from an external power source coupled to terminals 143 and 144. The external power source which is preferably located at the location of the control circuit provides a 24 volt A.C. signal to the control circuit. Reference herein to the power source being located in the area of the control circuit is intended to refer to the fact that the control circuit obtains its power from an outlet located adjacent to the control circuit instead of having to receive its power from the input control console and thus the power source for the control circuits can be wired totally independently of the wiring connecting the video cameras to the input control console. The power that is supplied can be obtained either from a power line that only carried 24 volts from a master supply or from a step down transformer located in the area of the video camera, which transformer is coupled to a normal 115 A.C. line source.

The power that is supplied to the control circuit is rectified by rectifier 146. The rectifier provides an output D.C. voltage of 36 volts which is supplied to input line 118 of the control circuit. The voltage on input line 118 of the control circuit normally remains at 36 volts D.C. unless such voltage is varied by actuation of any of the controls from input console 60 that are associated with this particular control circuit. Input control console 60 is coupled to input line 118 through the voltage control circuit 150. As previously explained, the voltage that is normally established on input line 118, the 36 volts D.C., is the voltage that appears on the transmission line coupling input control console 60 with this control circuit. Upon actuation of various control actuating members at control console 60, the voltage on such line can be caused to drop to a lower level thereby causing a similar drop in the voltage across input line 118. If the control circuit is simultaneously coupled to two input consoles and controls at both are actuated, the voltage on line 118 will drop to the voltage of the lowest level zener diode actuated between the two input consoles and hence the control circuit will respond to that selected function.

When the voltage on line 118 remains at 36 volts D.C. then all of the zener diodes are caused to break down including the lockout zener diode designated as LOSW in FIG. 9. As previously explained, actuation of zener diode LOSW blocks the output of zener diodes SW-1 through SW-6. Zener diode SW-7 and the associated gate TR Gate 7 is set up so as to provide an output signal for actuating transistor switch TR-7 only when the 3.9 volt zener diode of switch SW-7 has not been actuated, as will be further described below.

The basic operation of the circuitry of FIG. 9 with respect to the various gating circuits will be described in connection with Gate 1, 156, which is exemplary of the operation of the other various sections of the circuit. When actuation of a particular control member at the input console 60 causes the voltage on input line 118 to be at a level between 25 and 30 volts, zener diode SW-1 will break down but zener diode LOSW will not breakdown. Accordingly there is a high on the output of zener diode SW-1. Since the integrated circuit that forms the various gates such as gate 156 has a limitation as to the voltage of the inputs that it can receive, the 5.1 volt zener diode 152 limits the output voltage from zener diode SW-1 to 5.1 volts which is then applied to terminal T-1 of Gate 156. Since the voltage on input line 118 is below 30 volts, zener diode LOSW does not breakdown and hence there is a low on the output side of such zener diode. This low is fed to the input of inverter 154 which provides a high at its output that is supplied to terminal T-2 of Gate 156. Thus when the voltage on input line 118 is at least 25 volts but below 30 volts Gate 156 receives highs at both of its inputs thereby causing the AND gate to provide an output signal that in turn is supplied to transistor switch TR-1 which provides an appropriate output control signal. However, if the voltage on input line 118 is above 30 volts then actuation of Gate 156 is blocked. When the voltage is above 30 volts, zener diode LOSW breaks down thereby causing a high at the input of inverter 154 which supplies a low to terminal T-2 of Gate 156. Since now there is a high on terminal T-1 but a low on terminal T-2 of AND Gate 156, the AND gate does not provide any output signal. Consequently actuation of the next highest level zener diode, in this case the 30 volt zener diode LOSW, blocks the output of the lower level zener diode, here the 25 volt zener diode SW-1. The circuitry that is associated with Gate 2 through Gate 6 operates in the same manner.

Returning to the seventh level switch of the control circuit it will be seen that this level operates in response to the creation of a zero voltage on input line 118. To start, it must be noted that point 190 within Gate TR-7 is coupled to point 186 of internal power supply 184. As will be explained further below, terminal 186 of power supply 184 is maintained at 12 volts and hence a voltage of 12 volts normally is supplied to terminal 190. When a zero voltage is supplied on input line 118, the 3.9 volt zener diode SW-7 does not break down and therefore there is a low supplied to the base of the transistor of TR Gate 7. The low at the base of this transistor means that the transistor remains in an off condition and hence this transistor does not effect the voltage supplied at terminal 190 from the internal power supply 184. Accordingly, the 12 volts at terminal 190 supplies a voltage to the base of the transistor of transistor switch TR-7 which turns on this transistor. Accordingly, the transistor of TR-7 provides an output signal on line 192 which in turn can be used to control one of the control functions. Consequently, the presentation of a zero voltage on line 118 leads to an output signal for controlling one of the control functions. On the other hand, when the voltage on line 118 is above 3.9 volts then zener diode SW-7 will break down thereby causing a high on the base of the transistor of TR Gate 7 thereby turning such transistor on. The activation of this transistor will create a low at point 190 which is coupled to the base of the transistor of TR-7 and therefore prevents actuation of the transistor of TR-7.

While in the circuit of FIG. 9, the output of transistor switch TR-7 is used to actuate one of the control functions, here actually being designated for an auxilliary function, in the circuits of FIGS. 10 and 11, such signal is used as a reset signal. Turning to FIGS. 10 and 11, it can be seen that the output of the transistors 194 and 196 are coupled to the reset input of the various latching circuits. Each of the latching circuits is a latching circuit micro-chip that provides an output signal at output terminal Q whenever a signal is supplied at input set terminal S. The output at terminal Q continues to be supplied until a reset signal is supplied at input reset terminal R. Taking latching circuit 198 in FIG. 11 as an example, actuation of Gate 3 of the circuit of FIG. 11 will provide a signal at input terminal S of latching circuit 198. The latching circuit will provide an output signal at output terminal Q which in turn provides a signal for switching the associated video camera from either its off to its on condition or from its on to off condition. Thus the signal on output terminal Q will remain until the reset terminal R is supplied with a reset signal from transistor 196.

As previously explained, an internal power supply circuit 184 is coupled to the output of rectifier 146.

Power supply circuit 184, which is shown in FIG. 9, provides a voltage of 24 volts at terminal 198. In addition, power supply 184 maintains a voltage of 12 volts at terminal 186 due to the arrangement of the two 12 volt zener diodes. Terminal 186 in essence acts as a floating ground as will become clear from the discussion of the circuitry for controlling camera focus control motor 188. Terminal 198 with the 24 volts is coupled to the second transistor of transistor switch TR-6. In dependence upon whether transistor switch TR-5 or transistor switch TR-6 is actuated, the voltage at point 200 will be either at 24 volts or zero volts. Point 200 is coupled to one terminal of camera focus control motor 188. The other terminal of camera focus control motor 188 is coupled to the 12 volts at point 186, which serves as a lens common. Thus, if point 200 is at 24 volts current will flow from point 200 towards point 186 thus in one direction through camera focus control motor 188. On the other hand, if point 200 is at zero volts current will flow through camera focus control motor 188 in the opposite direction. The direction of operation of camera focus control motor depends upon the direction of current flow. Consequently with point 186, which is the lens common, serving as a floating ground, by varying the voltage at point 200, camera focus control motor 188 can be driven in either direction.

The operation of the camera iris control motor 182 is set up to operate in the same type of manner as camera focus control motor 188, as discussed above. Thus, one terminal of camera iris control motor 188 is coupled to point 186, the lens common, while the other terminal 180 is coupled to transistor switches TR-3 and TR-4. In dependence upon which of the two transistor switches, TR-3 and TR-4 is actuated, the voltage on terminal 180 will be at either zero or 24 volts and this will determine the direction of current flow through camera iris control motor 182. Here again the direction of current flow through motor 182 will control the direction in which the motor is driven.

In addition to enabling camera iris control motor 182 to be selectively controlled from input terminal 60 for adjusting the opening of the iris of the video camera, the motor also can be controlled so as to vary the opening of the iris to maintain the brightness of the video signal within certain predetermined limits. For this purpose, an automatic iris control circuit 160 is coupled to the control circuit of FIG. 9. The automatic iris control circuit 160 receives input signals from a video signal amplifier 162 the output of which is dependent upon the light passing through the lens of the corresponding video camera. The output voltage of video signal amplifier 162 is supplied to terminal 202 which is connected to the two zener diodes 166 and 168. In selecting the voltage levels for zener diodes 166 and 168, it has been predetermined that in the operation of the system the iris of the video camera should be maintained at an opening so that the light passing through the lens will cause the voltage at terminal 202 to be between 3.3 volts and 4.3 volts with such voltage level corresponding to a desired range of brightness of the video signal. The range of brightness and these voltage levels can be varied to any desired level.

Turning first to zener diode 166, if the voltage on terminal 202 is above 3.3 volts then there is a high at the input side of inverter 170 and a low at the output side of the inverter. However, if the voltage at terminal 202 is below 3.3 volts, which is the breakdown voltage of zener diode 166 then the diode does not breakdown and there is a low at the input side of inverter 170. The low going into inverter 170 causes a high at its output which in turn causes a signal to be supplied to the base of the transistor of transistor switch TR-4 for turning on such transistor. Consequently the transistor of transistor switch TR-4 will be turned on whenever the output of the video signal amplifier falls below 3.3 volts.

Turning now to the second zener diode 168 of the automatic iris control circuit 160, this diode provides for operation of the iris control motor whenever the output of the video signal amplifier at terminal 202 goes above 4.5 volts. When the voltage at terminal 202 is above 4.5 volts, zener diode 168 breaks down thereby causing a high at the input of inverter 174 which in turn causes a low at the input of inverter 172 which in turn causes a high at the output of inverter 172. This high is then supplied to the base of the first transistor of transistor switch TR-3 which turns on such transistor. Actuation of the transistors of transistor switch TR-3 will in turn cause operation of the camera iris control motor 182. Consequently whenever the voltage from video signal amplifier 162 that is supplied to terminal 202 rises above 4.5 volts the camera iris control motor 182 is operated so as to appropriately vary the opening of the iris.

During the operation of the automatic iris control circuit and the associated transistor switches TR-3 and TR-4, the situation could arise where the iris size is completely driven to one extreme or the other and still the voltage at terminal 202 is either below 3.3 volts or above 4.5 volts. In such situations, the automatic iris control circuit would continue to provide control signals attempting to continue the driving of camera iris control motor 182. In order to prevent such an occurrence, capacitors 176 and 178 are coupled to the base of the first transistors of the transistor switches TR-3 and TR-4. Operation of the transistors, therefore, only continues until capacitors 176 and 178 are fully charged which then causes the voltage applied to the base of the transistors to drop to ground thereby turning off such transistors. The time duration is determined by the RC time constant and in the embodiment shown the resistor is 10K ohms and the capacitor is 10 microfarads.

Figure 12:
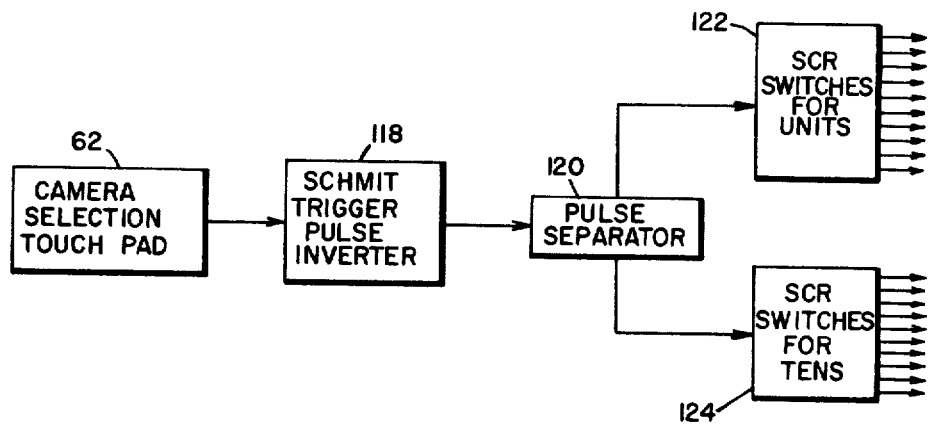
FIG. 12 is a block circuit diagram of the decoder in the input control console of the present invention.

As previously discussed, before applying the functional control signals within the input console 60, the operator must select which camera is to be controlled. Such selection is made by the operator in a camera selection touch pad 62, such as shown in FIG. 12. The output of the touch pad is coupled to a decoder 66. Decoder 66 includes a Schmit trigger pulse inverter 118 that generates pulses that are provided at the outputs of the decoder. A pulse separater 120 separates the pulses so that they are first applied at the 10's position (the first digit of the code) and then applied at the unit's position (the second digit of the code). A set of SCR switches for the 10's position 122 provides an output signal on a line that corresponds to the first digit selected by the camera selection pad 62. Next, a set of SCR switches for the unit's position 124 provides an output signal on the line corresponding to the unit's digit selected by camera selection pad 62. The outputs from SCR switch circuits 122 and 124 are provided to a switch circuit 72 that then couples the function selection controls to the particular camera that has been selected by the operator for control by the input control console.

After the particular video camera to be controlled has been selected, the operator then selects the particular function to be carried out through function selection pad 68. This function selection pad can be similar to input circuit 24 if there are only 7 functions being carried out. For each function there is a separate manually operated input function selection member. The output from function selection pad 68 is provided to function selection circuit 70 and from there through switch circuit 72 to the particular camera that has been selected for control. After the desired functions for one camera have been carried out, the next camera to be controlled can be selected.

Figure 13:
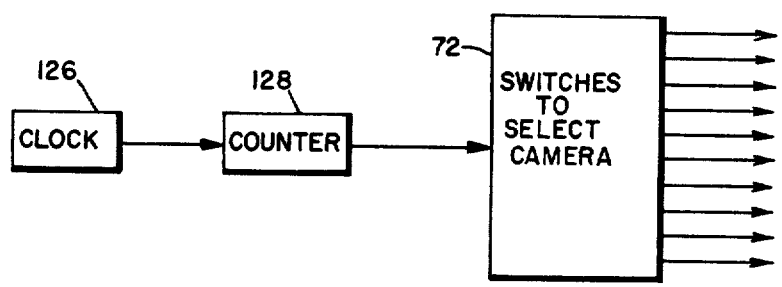
FIG. 13 is a block circuit diagram of the sequencer in the input control console in accordance with the present invention.

As an alternative to selecting a particular video camera to be controlled by input console 60, it is possible for the operator at the console to select a group of cameras to be controlled. Thus, the operator can select, for example, all the cameras in the 20's group, i.e. cameras 20-29, or the 40's group. In order to carry out such an operation, the operator first selects the digit for the 10's position through camera selection pad 62. After selecting the first digit, the operator then actuates sequencer 64 which generates the signals for activating all of the units within the selected 10's group. The basic circuitry of sequencer 64 is illustrated in FIG. 13. The sequencer includes a clock 126 which determines the time interval for selecting each of the unit members of the selected group. The output from clock 126 is provided to a counter 128. In turn, the output of counter 128 steps through each of the switches for selecting the particular camera unit within the group. The switches to which the output of the counter is connected is designated by box 138. The output of switches 138 then can be provided through decoder 66 to switch circuit 72.

Figure 14:
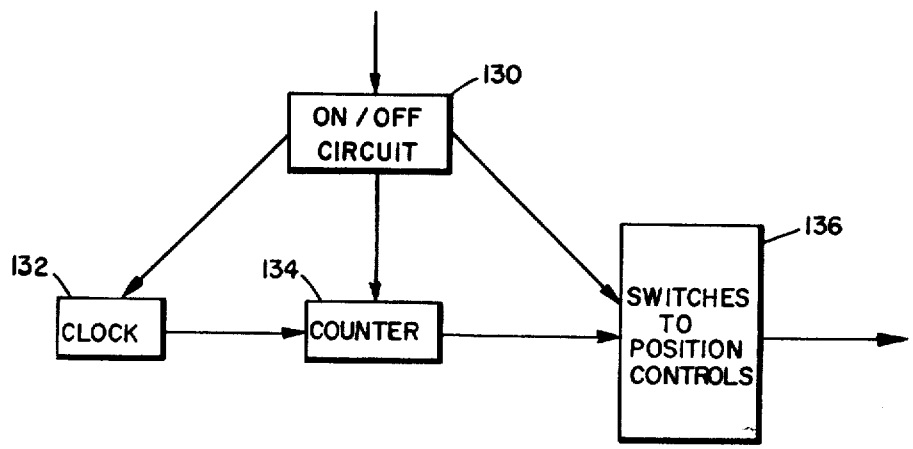
FIG. 14 is a block circuit diagram of the preset interval scan of the control device of the present invention.

When preset interval scan circuit 110 is actuated, a signal is received by on/off circuit 130 which turns on the components of scan circuit 110, which are shown in FIG. 14. Upon actuation, a clock 132 generates clock pulses for controlling a counter 134. Counter 134 provides output signals for causing the camera to move through each of the preselected positions. Normally, the output from counter 134 is a random output so that the interval scan need not proceed in a particular preset pattern. The output from counter 134 is applied to switches 136 for controlling the position controls. As previously discussed, the output from switches 136 can be either directly coupled to pan and tilt controls 114 or it can be fed back through the switch network for controlling the movement of the camera. Each of the outputs from switches 136 corresponds to a particular preselected position which can be set with the use of the micro-switches as previously described above.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A video camera system comprising: at least one video camera said video camera being capable of a plurality of different functions; input means for providing a plurality of different level input voltage signals; and a plurality of control circuit means associated with each video camera, each said control circuit means associated with a video camera being able to simultaneously provide a control signal in response to an input voltage signal such control signal serving to enable a separate control function of the associated video camera and each of said control circuit means including:

a plurality of first switch means coupled to receive the input voltage signals from said input means, each of said first switch means being activated when the voltage is above a corresponding predetermined level with the predetermined level for each said first switch means being different and each of said first switch means providing at its respective output a first switching signal upon being activated;

a plurality of blocking means, each being coupled to the output of a respective one of said first switching means except for said first switching means corresponding to the lowest level input voltage signal, and each of said blocking means providing a blocking signal upon receiving a first switching signal from the corresponding said first switching means and an enabling signal absent receipt of a first switching signal from the corresponding said first switching means;

a plurality of gating means each being coupled to a corresponding one of said first switching means and said blocking means associated with said first switching means that is to be activated by the next higher level input voltage signal, each of said gating means providing at its output a gated signal when receiving a first switching signal from the corresponding said first switching means and an enabling signal from the associated said blocking means and said gating means providing no output signal when said gating means receives a blocking signal from the associated said blocking means; and, a plurality of output means for selectively controlling the different functions of the associated video camera, each of said output means being coupled to receive the gated signals of one of said gating means and the output of said output means enabling corresponding control functions of the associated video camera.

2. A system as defined in claim 1, wherein each of said first switch means includes:

a zener diode having a predetermined breakdown switch voltage with such breakdown voltage of said zener diode being different from the breakdown voltage of said zener diodes of the other of said first switch means such that when said first switch means receives an input voltage signal above the predetermined breakdown voltage of the corresponding said zener diode said first switch means will provide a first switching signal.

3. A system as defined in claim 1 or 2, wherein said blocking means includes an inverter that provides an enabling signal when the corresponding said first switch means has not been activated and provides a blocking signal when the corresponding said first switch means has been activated with such enabling signals and blocking signals being supplied to said gating means associated with said first switching means of the next lowest level voltage signal.

4. A system according to claim 3, wherein each of said gating means includes an AND gate, each of said AND gates being coupled to the output of an associated one of said first switch means and the output of said inverter associated with said first switch means corresponding to the next highest level input voltage signal.

5. A control mechanism for selectively providing a plurality of control signals, each of said control signals serving to enable a separate control function of a system capable of a plurality of different functions, said mechanism comprising:
  at least one control circuit means for controlling various functions of the system and having an input voltage signal line;
  power supply means for providing an input voltage signal to said input signal line of said control circuit means;
  input means coupled to said input line of said control circuit means for enabling the input voltage signal on said input line supplied by said power supply means to be selectively set to any one of a plurality of different voltage levels; and
  said control circuit means includes: a plurality of switching means coupled to receive the input voltage signal on said input line of said control circuit means, each of said switching means being activated when the input voltage signal is above a corresponding predetermined level with the predetermined level for each of said switching means being different; a plurality of gating means each associated with one of said switching means, said gating means only being activated when the corresponding said switching means has been activated and said switching means associated with the next highest input voltage level signal has not been activated so that only one of said switching means provides an output in response to the input voltage signal; and a plurality of output means for selectively controlling different functions of the system being controlled, each of said output means being coupled to the output of one of said gating means and causing one of the functions of the system to be activated when receiving an output signal from the corresponding one of said gating means.

6. A control mechanism according to claim 5 wherein said input means enables a plurality of functions to be carried out by said control mechanism to be individually manually selected and said input means includes input selecting means for enabling one function from each said control circuit means to be simultaneously activated when there are at least two of said control circuit means.

7. A control mechanism according to claim 5 or 6 wherein there are two input means coupled to each said control circuit means and said control circuit means will operate in response to the lowest level voltage signal created on its said input line.

8. A control mechanism according to claim 5 wherein the system being controlled includes a plurality of controlled members each being capable of several controlled functional operations, wherein said input means includes member selection means for generating a coded signal corresponding to the selected controlled member and a decoding means for enabling the input voltage signals to be coupled to the controlled means selected for operation.

9. A control mechanism according to claim 8 wherein said decoding means is a decimal multiplex decoder.

10. A control mechanism according to claim 5, 6 or 8 further comprising positioning means coupled to outputs of said output means for moving a movable controlled member of the system into one of a plurality of preselected positions.

11. A control mechanism according to claim 10 wherein said positioning means includes a plurality of mercury switches mounted on the movable member for providing signals for terminating movement of the movable member when it reaches one of its preselected positions.

12. A control mechanism according to claim 10 further comprising interval scan means for causing such movable controlled member to move through each of the plurality of preselected positions.

13. A control mechanism according to claim 12 wherein said interval scan means randomly selects the order of the preselected positions to which the movable controlled member will be moved.

14. A control mechanism according to claim 12 wherein said interval scan means includes: timing means for determining the dwell time of the movable member in each of the preselected positions; counting means for randomly selecting the order of the preselected positions to which the movable member will be moved; and interval scan voltage generating means for providing the appropriate voltage level signal corresponding to the selected preselected position.

15. A control mechanism according to claim 8 wherein there are at least two groups of controlled members and further comprising sequencing means for enabling one of said groups of controlled members to be selected and then automatically coupling the input signals to each of the controlled members of the selected group one at a time.

16. A control mechanism according to claim 5, 6 or 8, wherein each of said switching means includes: a zener diode having a predetermined breakdown switching voltage with such breakdown voltage of said zener diode being different from the breakdown voltage of said zener diodes of the other said switching means of the respective said plurality of switching means such that when said switching means receives an input signal above the predetermined breakdown voltage of the corresponding said zener diode said switching means will provide a switching signal.

17. A control mechanism according to claim 16 wherein each of said gating means includes an AND gate that is coupled to the output of a corresponding one of said switching means and the output of said switching means corresponding to the next highest voltage level and said gating means further including an inverting circuit connected between each of said AND gates and the output of said switching means corresponding to the next highest voltage level so that said AND gate is only actuated absent the activation of said switching means corresponding to the next highest voltage level.

18. A control mechanism according to claim 5, 6 and 8 wherein none of said switching means is activated when the voltage level on said input line of said control circuit is at its maximum value.

19. A control circuit mechanism according to claim 5 wherein: said mechanism is used for controlling the operation of various video cameras of a video camera monitoring system; there is at least one of said control circuit means associated with each of the video cameras; and said input means is a master control input means coupled to said input line of each of said control circuit means.

20. A control mechanism according to claim 19 wherein at least one of said control circuit means includes an iris control means for automatically adjusting an iris of a controlled video camera when said iris control means is activated.

21. A control mechanism according to claim 20 wherein said iris control means operates so as to vary the opening of the iris so that the light received by the video camera is maintained within certain preselected limits and said iris control means includes: a video amplifier means for generating an output signal in dependence upon the light received, means for generating an iris output signal depending upon the light received, means coupled to receive the iris output signal and varying the size of the iris in dependence upon such signal and means for limiting the time duration of operation of said means for varying the size of the iris.

22. A control mechanism according to claim 21 wherein said means for varying the size of the iris includes a motor drive means and said time limiting means serves to prevent extended overdrive of said motor drive means.

23. A control mechanism according to claim 19 or 22 wherein at least one of said control circuit means includes focus control means for focusing a video camera.

24. A control mechanism according to claim 23 wherein said focus control means includes a focusing motor for varying the focus of the video camera and means for controlling the direction of operation of said focusing motor by varying the direction of current flow to said focusing motor.

25. A video camera monitoring system comprising:
at least one control circuit means associated with each of said video cameras for controlling various functions of said video camera and having an input voltage signal line;
power supply means for providing an input voltage signal to said input signal line of said control circuit means;
input means coupled to said input line of said control circuit means for enabling the input voltage signal on said input line supplied by said power supply means to be selectively set to any one of a plurality of different voltage levels, said input means including means for selecting one of said video cameras to be controlled and monitoring means for monitoring the images received by the selected said video camera; and
said control circuit means includes: a plurality of switching means coupled to receive the input voltage signal on said input line of said control circuit means, each of said switching means being activated when the input voltage signal is above a corresponding predetermined level with the predetermined level for each of said switching means being different; a plurality of gating means each associated with one of said switching means, said gating means only being activated when the corresponding said switching means has been activated and said switching means associated with the next highest input voltage level signal has not been activated so that only one of said switching means provides an output in response to the input voltage signal; and a plurality of output means for selectively controlling different functions of the system being controlled, each of said output means being coupled to the output of one of said gating means and causing one of the functions of the system to be activated when receiving an output signal from the corresponding one of said gating means.

26. A video camera monitoring system according to claim 25 wherein said input means enables a plurality of functions to be carried out by said control circuit means to be individually manually selected and said input means includes input selecting means for enabling one function from each said control circuit means associated with one of said video cameras to be simultaneously activated when there are at least two of said control circuit means.

27. A video camera monitoring system according to claim 25 or 26 wherein there are two input means coupled to each said control circuit means and said control circuit means will operate in response to the lowest level voltage signal created on its said input line.

28. A video camera monitoring system according to claim 25 wherein said input means includes member selection means for generating a coded signal corresponding to a selected said video camera and a decoding means for enabling the input voltage signals to be coupled to said video camera selected for operation.

29. A video camera monitoring system according to claim 25 or 28 further comprising positioning means associated with each said video camera and coupled to outputs of said output means for moving said video camera into one of a plurality of preselected positions.

30. A video camera monitoring system according to claim 29 wherein said positioning means includes a plurality of mercury switches mounted on said video camera for providing signals for terminating movement of said video camera when it reaches one of its preselected positions.

31. A video camera monitoring system according to claim 29 further comprising interval scan means associated with each said video camera for causing said video camera to move through each of the plurality of preselected positions.

32. A video camera monitoring system according to claim 28 wherein there are at least two groups of said video cameras and further comprising sequencing means for enabling one of said groups of said video cameras to be selected and then automatically coupling the input signals to each of said video cameras of the selected group one at a time.

33. A video camera monitoring system according to claim 25, 26 or 28, wherein each of said switching means includes: a zener diode having a predetermined breakdown switching voltage with such breakdown voltage of said zener diode being different from the breakdown voltage of said zener diodes of the other said switching means of the respective said plurality of switching means such that when said switching means receives an input signal above the predetermined breakdown voltage of the corresponding said zener diode said switching means will provide a switching signal.

34. A video camera monitoring system according to claim 25 or 26 wherein each of said gating means includes an AND gate that is coupled to the output of a corresponding one of said switching means and the output of said switching means corresponding to the next highest voltage level and said gating means further including an inverting circuit connected between each of said AND gates and the output of said switching means corresponding to the next highest voltage level so that said AND gate is only actuated absent the activation of said switching means corresponding to the next highest voltage level.

35. A video camera monitoring system according to claim 34 wherein none of said switching means is activated when the voltage level on said input line of said control circuit is at its maximum value.

36. A video camera monitoring system according to claim 25 wherein at least one of said control circuit means includes an iris control means for automatically adjusting an iris of a controlled video camera when said iris control means is activated.

37. A video camera monitoring system according to claim 36 wherein said iris control means operates so as to vary the opening of the iris so that the light received by the video camera is maintained within certain preselected limits and said iris control means includes: a video amplifier means for generating an output signal in dependence upon the light received, means for generating an iris output signal depending upon the light received, means coupled to receive the iris output signal and varying the size of the iris in dependence upon such signal and means for limiting the time duration of operation of said means for varying the size of the iris.

38. A video camera monitoring system according to claim 37 wherein said means for varying the size of the iris includes a motor drive means and said time limiting means serves to prevent extended overdrive of said motor drive means.

39. A video camera monitoring system according to claim 25 or 38 wherein at least one of said control circuit means includes focus control means for focusing a video camera.

40. A video camera monitoring system according to claim 39 wherein said focus control means includes a focusing motor for varying the focus of the video camera and means for controlling the direction of operation of said focusing motor by varying the direction of current flow to said focusing motor.

41. A video camera monitoring system comprising:
a plurality of movable video cameras;
input control means including camera selection means for enabling selection of one of said video cameras for control by said input control means;
a plurality of video camera control mechanisms, each being associated with one of said video cameras, said video camera control mechanism including interval scan means for causing the associated said video camera to move through each of a plurality of preselected positions, said interval scan means including: timing means for determining the dwell time of said video camera in each of the preselected positions; counting means for randomly selecting the order of the preselected positions to which said video camera will be moved; and interval scan signal generating means for providing an appropriate signal for causing said video camera to move to the selected preselected position.

42. A system according to claim 41 wherein each of said control mechanisms includes: a first plurality of first switching means coupled to receive input voltage signals from said input means, each of said first switching means being activated when the voltage is above a corresponding predetermined level with the predetermined level for each said first switch means being different and each of said first switch means providing at its respective output a first switching signal upon being actuated; a plurality of gating means each associated with one of said first switching means, said gating means only being activated when the corresponding said first switching means has been activated and said first switching means associated with the next highest input voltage level signal has not been activated so that only one of said first switching means provides an output signal in response to an input voltage signal; and a plurality of output means for selectively controlling different functions of said video camera being controlled, each of said output means being coupled to the output of one of said gating means and causing one of the functions of said video camera to be activated when receiving an output signal from the corresponding one of said gating means.

43. A video camera monitoring system according to claim 42 wherein there are two control mechanisms associated with each of said video cameras and said input means enables a plurality of functions to be carried out by said control mechanism to be individually manually selected and said input means includes input selecting means for enabling one function from each of said control mechanisms associated with one of said video cameras to be simultaneously activated.

44. A video camera monitoring system according to claim 43 wherein there are two input means coupled to each of said control mechanisms and said control mechanisms will operate in response to the lowest level voltage signal created on its input line.

45. A video camera monitoring system according to claim 44 further comprising power supply means for providing an input voltage signal to an input signal line of said control mechanism with each of said control mechanisms having its own power supply means; and wherein said input means is coupled to said input line of said control mechanism for enabling the input voltage signal on said input line supplied by said power supply means to be selectively set to any one of a plurality of different voltage levels.

* * * * *